United States Patent
Linder et al.

(12) 
(10) Patent No.: US 6,755,735 B2
(45) Date of Patent: Jun. 29, 2004

(54) UNITARY BLOW MOLDED COVER PANEL FOR A THRESHING REGION OF AN AGRICULTURAL COMBINE

(75) Inventors: Charles Linder, Flora, IL (US); Robert A. Matousek, Milan, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/199,815

(22) Filed: Jul. 19, 2002

(65) Prior Publication Data

US 2004/0014512 A1 Jan. 22, 2004

(51) Int. Cl.$^7$ ................................................ A01F 12/00
(52) U.S. Cl. ........................................ 460/119; 460/59
(58) Field of Search ........................... 460/69, 108, 119, 460/57, 66, 79, 80, 107, 109, 150; 52/630, 591.4, 591.5, 309.1; 428/174, 177, 179

(56) References Cited

U.S. PATENT DOCUMENTS

| | | | | |
|---|---|---|---|---|
| 857,718 A | * | 6/1907 | Calkins | 52/591.5 |
| 3,696,815 A | | 10/1972 | Rowland-Hill et al. | 130/27 J |
| 3,720,032 A | * | 3/1973 | Harman | 428/186 |
| 4,157,638 A | * | 6/1979 | Della-Donna | 52/309.9 |
| 4,249,543 A | | 2/1981 | Rowland-Hill | 130/27 T |
| 4,441,512 A | | 4/1984 | Busboom | 130/27 Z |
| 4,878,258 A | * | 11/1989 | Casey | 5/420 |
| 5,145,461 A | | 9/1992 | Tanis | 460/67 |
| 5,257,959 A | | 11/1993 | Tanis | 460/67 |
| 5,951,395 A | | 9/1999 | Peter | 460/119 |
| 6,085,485 A | * | 7/2000 | Murdock | 52/783.19 |
| 6,325,713 B1 | | 12/2001 | Haar et al. | 460/69 |
| 6,363,670 B1 | * | 4/2002 | Dewitt | 52/202 |

* cited by examiner

Primary Examiner—Thomas B. Will
Assistant Examiner—Meredith C. Petravick
(74) Attorney, Agent, or Firm—John William Stader; Collin A. Webb

(57) ABSTRACT

A one piece blow molded cover panel removably positionable in an access opening in a structure adjacent to a threshing region of an agricultural combine. The cover panel includes an inner wall, an outer wall generally co-extending with the inner wall in spaced relation thereto defining at least one cavity therebetween, and elongate upper and lower peripheral edge, and elongate spaced, side peripheral edges. A lower inner lip extends downwardly from the inner wall and the lower peripheral edge along substantially the length thereof, and an outer upper lip extends upwardly from the outer wall and the upper peripheral edge along substantially the length thereof, the cover panel having a size for insertion into the access opening in covering relation thereto with the lower inner lip in abutting relation to a lower edge of the structure defining a lower periphery of the opening and the outer upper lip in abutting relation to an upper edge of the structure defining an upper periphery of the opening, providing effective retaining, sealing, and enclosing functions.

15 Claims, 5 Drawing Sheets

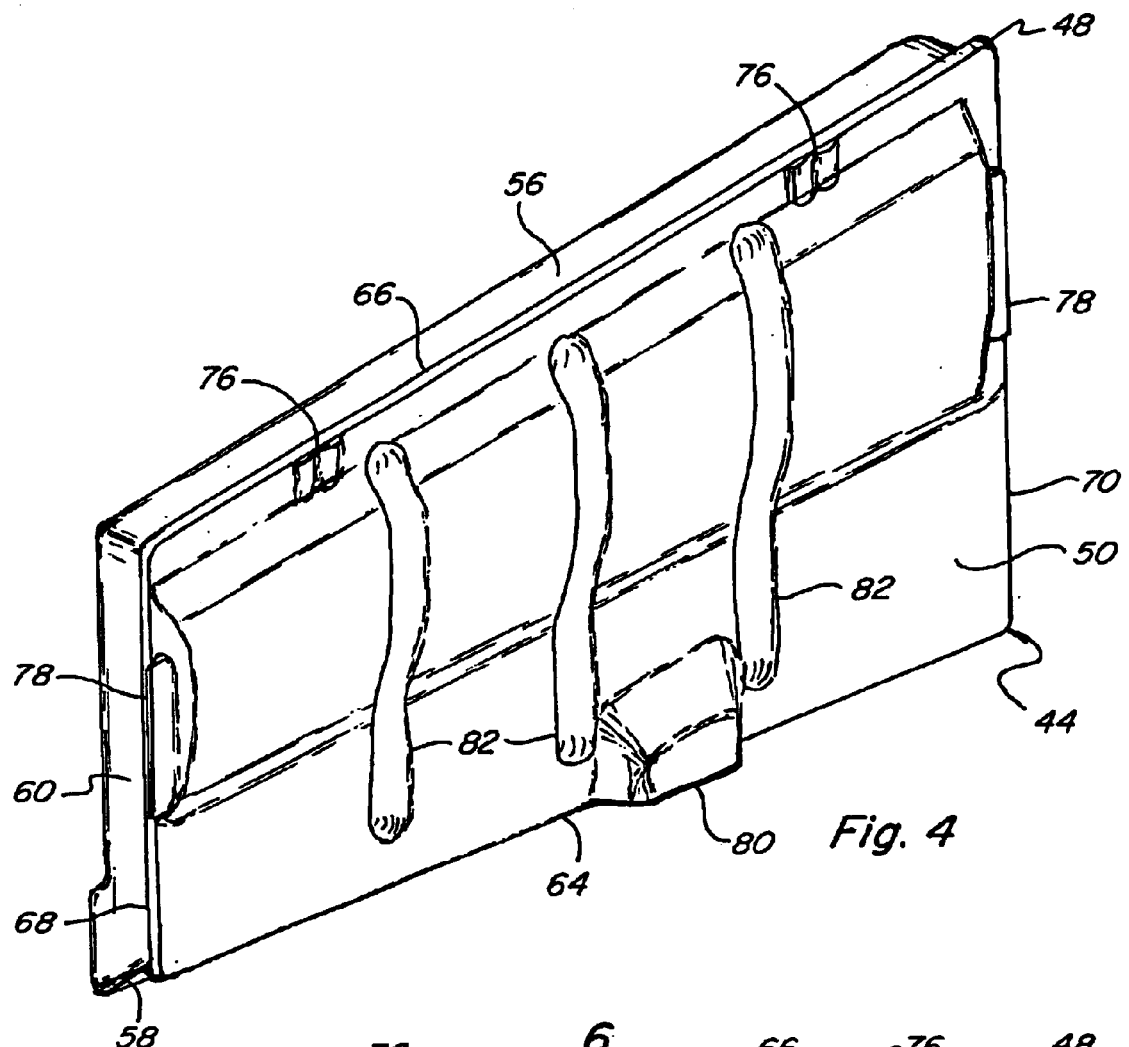
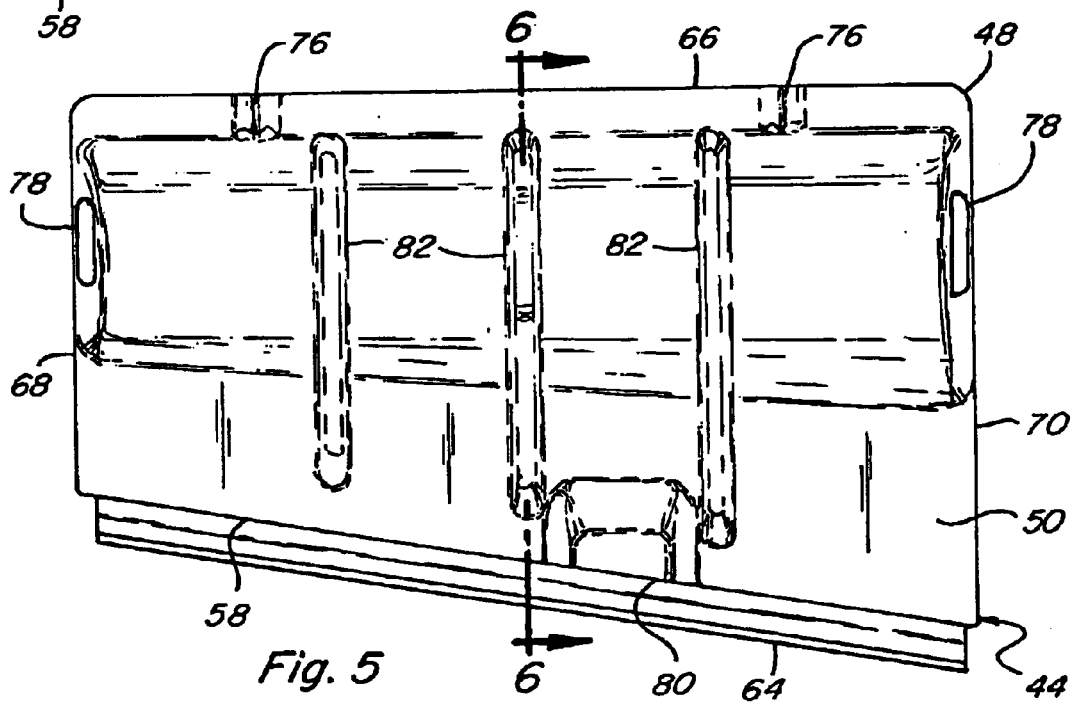

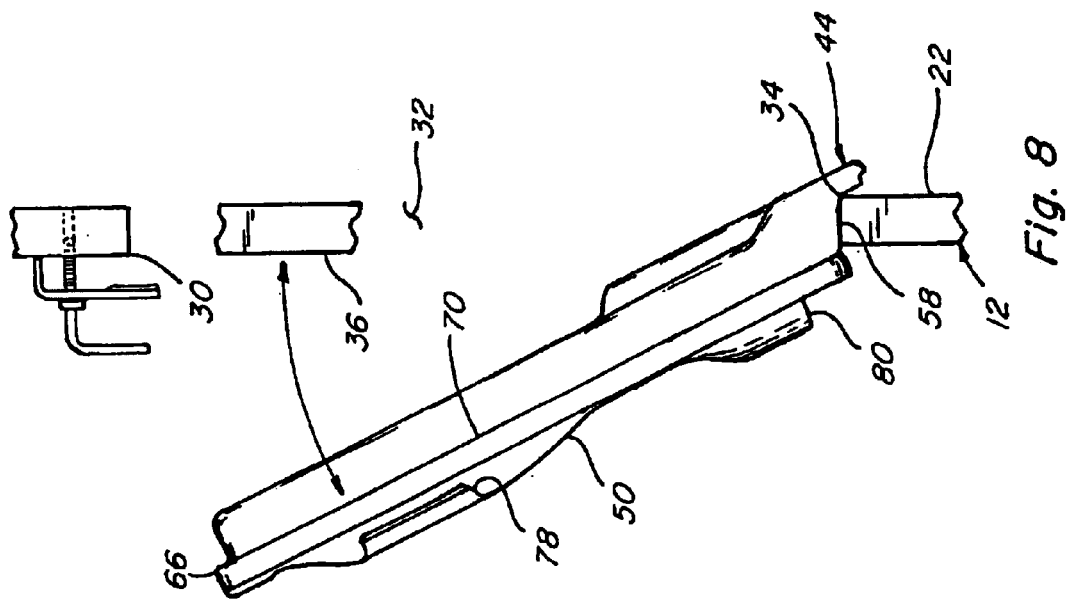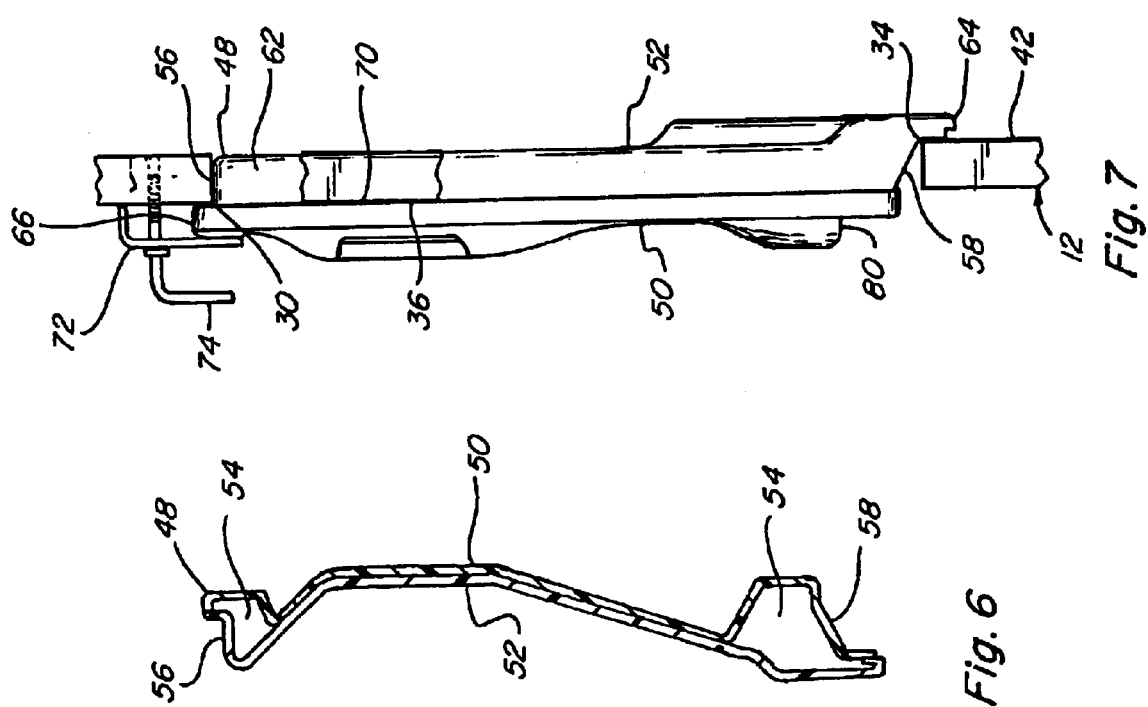

US 6,755,735 B2

UNITARY BLOW MOLDED COVER PANEL FOR A THRESHING REGION OF AN AGRICULTURAL COMBINE

TECHNICAL FIELD

This invention relates generally to a cover panel for an access opening to a threshing region of an agricultural combine, and more particularly, to a unitary blow molded cover panel insertable into and positionable in the access opening for blocking access to and escape of crop material from the threshing region therethrough.

BACKGROUND ART

It is well known to provide cover panels for access openings through side sheet frame members adjacent to the threshing region of an agricultural combine, including plastic molded cover panels. Reference in this regard, Haar et al U.S. Pat. No. 6,325,713 B1, issued Dec. 4, 2001 to Deere & Company. However, such known molded plastic cover panels disclose only a separate gasket added to the edges thereof to provide effective sealing against passage of crop material from the threshing region through the access opening, particularly along a lower peripheral edge thereof. Additionally, the lower edge of the reference cover panel seals along the outer surface of the side sheet, not the inner surface thereof facing the threshing region, such that crop material can collect on the lower inner edge defining the access opening, and could be more likely to escape if the panel becomes loosened or is removed.

Accordingly, what is sought is an improved molded cover panel that eliminates the need for added gaskets, and which provide a better sealing arrangement along the lower peripheral edge of an access opening to a threshing region of another agricultural combine.

SUMMARY OF THE INVENTION

According to the present invention, a one piece blow molded cover panel removably positionable in an access opening in a structure adjacent to a threshing region of an agricultural combine, which provides many of the above sought features and advantages, is disclosed. The structure typically includes an elongate upper edge facing away from the threshing region, an elongate lower edge opposite the upper edge and facing toward the threshing region, and spaced side edges extending between the upper edge and lower edge, defining and extending around the access opening, the access opening having a predetermined upward to downward extent between the upper and lower edge and a predetermined side to side extent between the side edges. The cover panel preferably includes an inner wall, an outer wall generally co-extending with the inner wall in spaced relation thereto defining at least one cavity therebetween, an elongate upper peripheral edge connecting the inner and outer walls and enclosing an upper periphery of the at least one cavity therebetween, an elongate lower peripheral edge connecting the inner and outer walls and enclosing a lower periphery of the at least one cavity therebetween, and elongate spaced, side peripheral edges connecting the inner and outer walls and enclosing opposite side peripheries of the at least one cavity. A lower inner lip extends downwardly from the inner wall and the lower peripheral edge along substantially the length thereof, and an outer upper lip extends upwardly from the outer wall and the upper peripheral edge along substantially the length thereof, the cover panel having an upward to downward extent as measured between the upper peripheral edge and the lower peripheral edge thereof only marginally smaller than the upward to downward extent of the access opening, and the panel preferably having a sideward extent as measured between the side peripheral edges marginally smaller than the sideward extent of the access opening, such that the cover panel is positionable in covering relation to the access opening with the lower inner lip in abutting relation to the lower edge of the structure and the outer upper lip in abutting relation to the upper edge of the structure, providing effective retaining, sealing, and enclosing functions.

BRIEF DESCRIPTION OF THE DRAWINGS

FIG. 4 is a perspective view of the forward cover panel for the forward access opening of the side sheet of FIGS. 2 and 3;

FIG. 5 is an enlarged view of the forward side panel of FIG. 4;

FIG. 6 is a sectional view taken along line 6—6 of FIG. 5;

FIG. 7 is an end view of the cover panel of FIG. 4, shown in covering relation to the forward access opening of the side sheet of FIGS. 1 and 2; and FIG. 8 is another end view of the cover panel of FIG. 4, shown tilted for installation and removal.

DETAILED DESCRIPTION OF THE INVENTION

Figure 1:
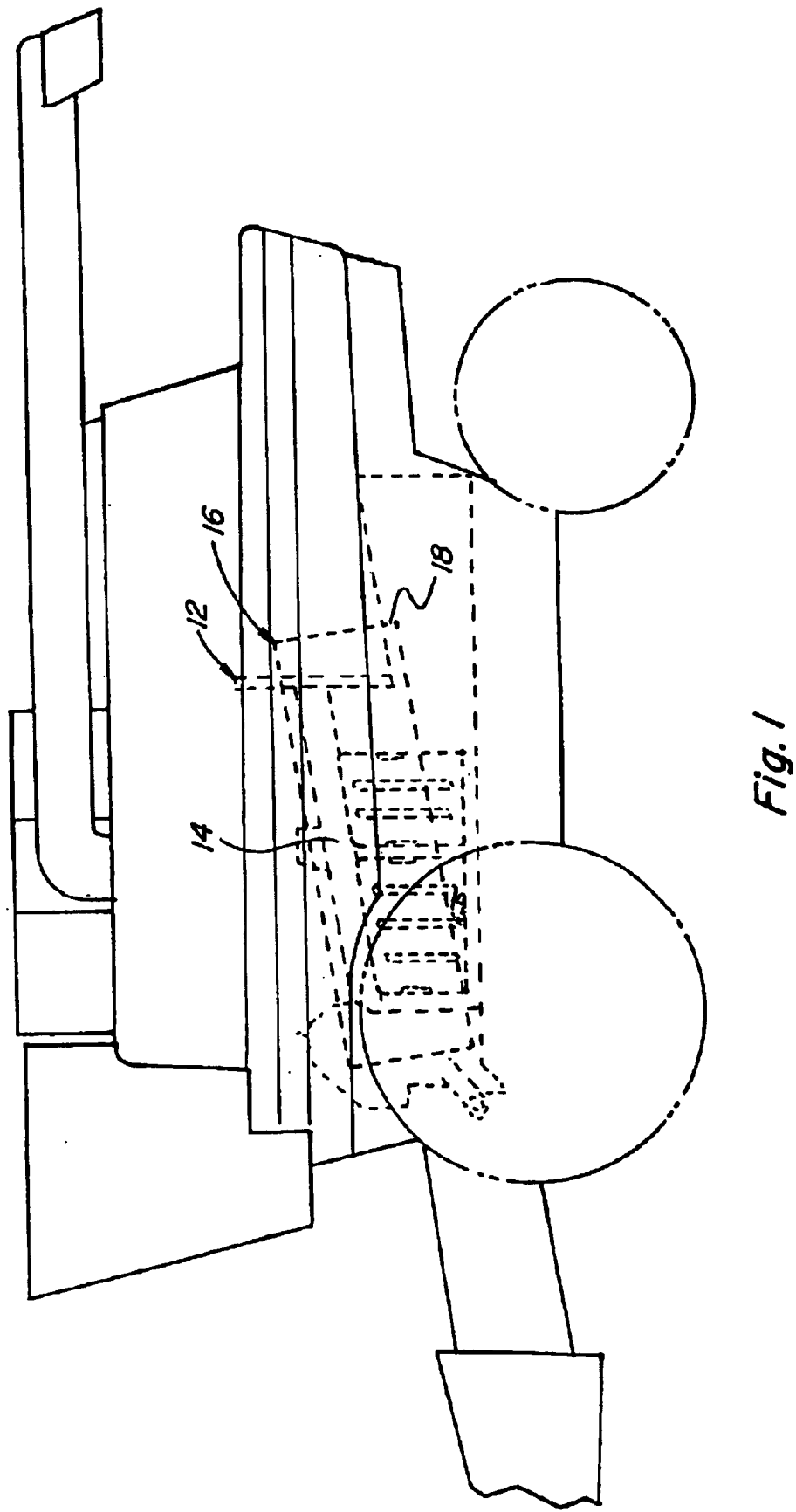
FIG. 1 is a simplified schematic side view of an agricultural combine, showing the outline of a threshing mechanism within a threshing region thereof, a side sheet adjacent to the threshing region, and cover panels according to present invention in covering relation to access opening in the side sheet.

Referring now the drawings, wherein a preferred embodiment of the present invention is shown, in FIG. 1, a typical prior art self propelled agricultural combine 10 is shown, including a side sheet structure 12 adjacent one side of a threshing region 14 including a threshing mechanism 16 which includes one or more rotatable rotors 18 rotatable for separating crops harvested by combine 10 from straw and other residue, in the well known conventional manner.

Figure 2:
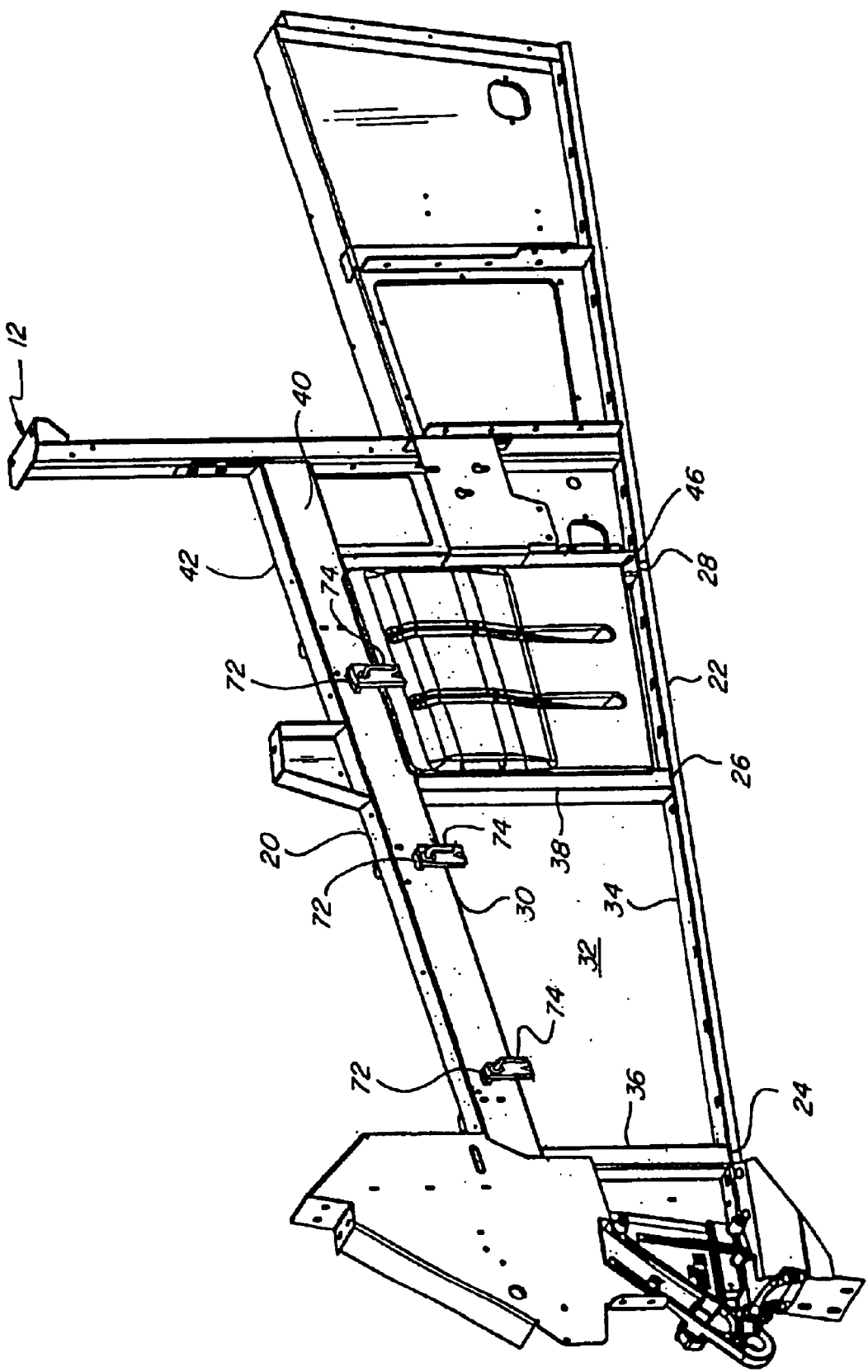
FIG. 2 is an enlarged perspective view of a side sheet of the combine of FIG. 1, showing a forward access opening without a cover panel, and a rearward access opening covered by a cover panel.
Figure 3:
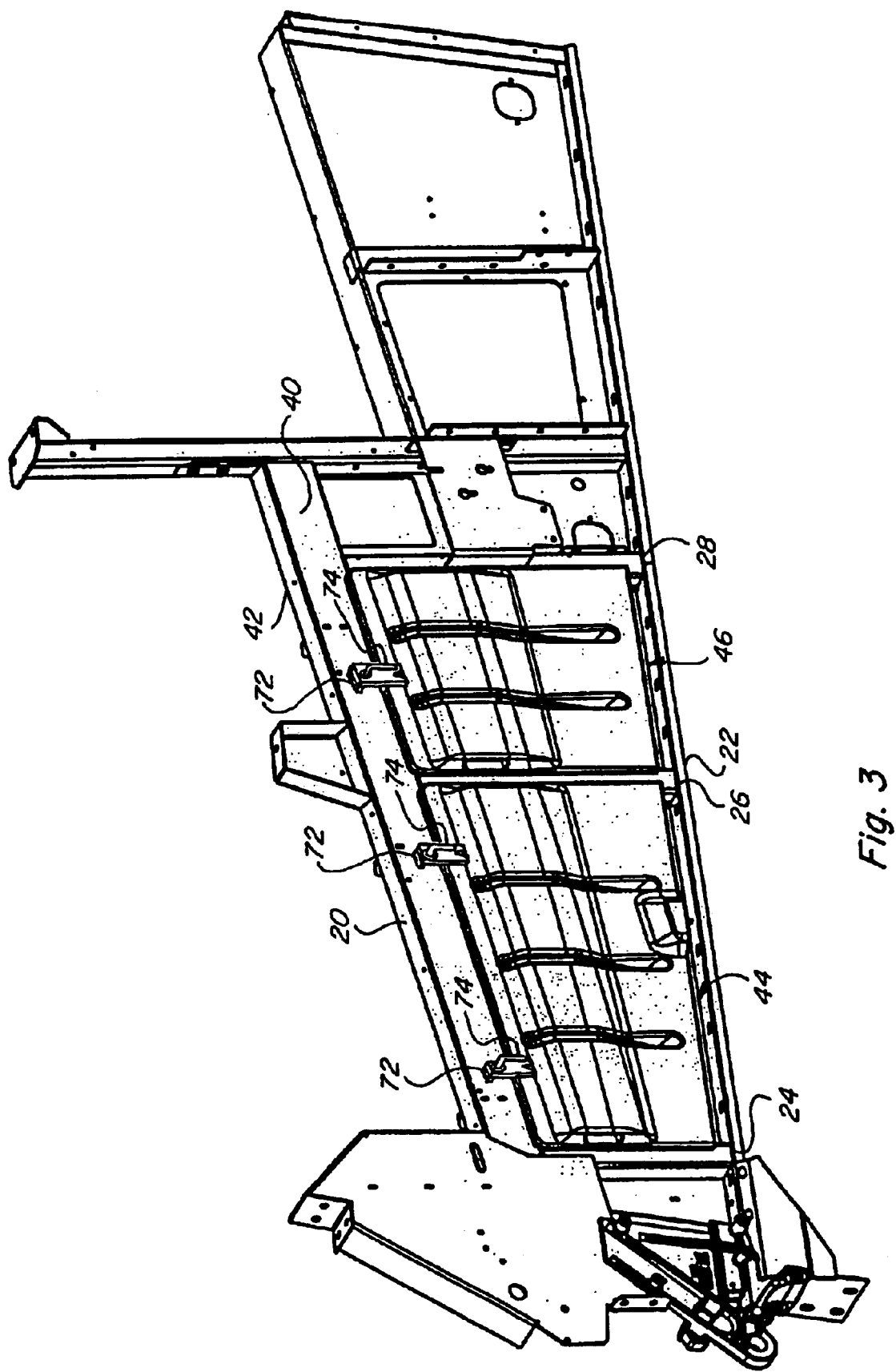
FIG. 3 is another perspective view of the side sheet structure showing a cover panel of the invention in covering relation to the forward access opening.

In FIGS. 2 and 3, side sheet structure 12 is shown and is representative of various well known structures for enclosing one side of the threshing region of a combine, such structure typically being constructed of sheet metal beams, posts, and other structural members. Side sheet structure 12 includes, among various elements, vertical spaced forward to rearward extending upper and lower frame members 20 and 22, and a plurality of spaced vertical frame members 24, 26 and 28. Upper frame member 20 include an elongate edge 30 defining an upper periphery of a forward access opening 32. Lower frame member 22 includes an elongate edge 34 defining a lower periphery of opening 32, and frame member 24 and 26 include edges 36 and 38, respectively, defining side peripheries of opening 32. Edges 30, 36 and 38 are located adjacent an outer surface 40 of side sheet structure 12, and edge 34 is adjacent an inner surface 42 (FIG. 7). Side sheet structure 12 is oriented such that outer surface 40 faces away from threshing region 14, and inner surface 42 faces threshing region 14. Frame members 20, 22, 26 and 28 define a rearward access opening similar to forward access opening 32, and another side sheet structure (not shown) is located adjacent to an opposite side of the threshing region 14. faces away from threshing region 14, and inner surface 42 faces threshing region 14. Frame members 20, 22, 26 and 28 define a rearward access opening similar to forward access opening 32, and another side sheet structure (not shown) is located adjacent to an opposite side of the threshing region 14.

When preparing combine 10 for harvesting, and periodically during breaks in the harvesting operation, it is desirable to view threshing region 14, including threshing mechanism 16, to ensure that everything is in good working order, adjusted, and to inspect for undesirable conditions, for instance, broken parts, build up of crop residue, misadjustments, wear, and the like. Forward access opening 32 and the rearward access opening are provided to allow accessing threshing region 14 for the above purposes and for removing built up crop material and the like. However, if forward access opening 32 and the rearward access opening are allowed to remain open during operation of threshing mechanism 16, a significant amount of the crop material will be cast through the opening so as to build up outside of threshing region 14, and possibly be lost.

Referring also to FIGS. 3 and 4, to avoid such undesirable consequences, the forward cover panel 44 is provided for covering forward access opening 32, and a rearward cover panel 46 is provided for covering the rearward access opening. It is desirable for cover panels 44 and 46 to be easily openable and removable for inspecting and accessing threshing region 42. It is also desirable for panels 44 and 46 to be light weight and easy to carry. Additionally, panels 44 and 46 should desirably provide an effective seal to prevent passage of grain and other crop material through the access opening when covered, and to provide at least some sound deadening.

To provide these sought after features, each of the forward and rearward cover panels 44 and 46, as represented hereinafter by forward cover panel 44, is designed and constructed so as to be easily insertable into position in sealed relation to the respective access opening, and easily removable therefrom, to be light weight, and provide at least some degree of sound deadening.

Referring also to FIGS. 5, 6 and 7, forward cover panel 44 includes a unitary blow molded, double walled plastic body 48, including spaced outer and inner walls 50 and 52, respectively. Outer wall 50 and inner wall 52 are generally or substantially coextensive, or overlay one another, so as define a plurality of internal cavities or spaces 54 therebetween (FIG. 6). Body 48 includes an elongate upper peripheral edge 56 connecting walls 50 and 52 along the lengths thereof, and enclosing an upper periphery of an uppermost cavity 54. Similarly, body 48 includes a lower peripheral edge 58 connecting lower ends of wall 50 and 52 and enclosing a lower periphery of a lowermost cavity 54. Lower peripheral edge 58 is inclined downwardly from wall 50 to wall 52. Additionally, body 48 includes side peripheral edges 60 and 62 connecting opposite sides of wall 50 and 52, and enclosing any sidewardly located cavity between wall 50 and 52 (not shown).

Body 48 has an upward to downward extent as measured between edges 56 and 58 at any location therealong which is only marginally smaller than a correspondingly located upward to downward extent of access opening 32 as measured between upper and lower edges 30 and 34. Similarly, body 48 has a sideward extent as measured between side edges 60 and 62 which is only marginally smaller than a sideward extent of opening 32 between edges 36 and 38. This enables insertion of body 48 into opening 32 in covering relation thereto.

Importantly, an integrally formed inner lower lip 64 extends downwardly from inner wall 52 below and adjacent to lower edge 58, such that when body 48 is located in covering relation to opening 32, lower lip 64 will extend downwardly beneath edge 34 in abutment therewith for effectively sealing the lower periphery of opening 32 and preventing escape of grain from threshing region 14 therethrough. An integral outer upper lip 66 extends upwardly from outer wall 50 adjacent to and along edge 56, and integral outer side lips 68 and 70 extend sidewardly from outer wall 50 adjacent to and along side edges 60 and 62 for engagement with edges 30, 36, and 38, respectively, for preventing passage of panel 44 through opening 32, and for providing at least some sealing function around the remaining peripheral portions of opening 32.

Upper frame member 20 of side sheet structure 12 preferably includes at least one conventional retainer bracket 72 securable in a position as shown in FIGS. 2, 3 and 7, by a handle 74 which threadedly attaches to frame 20, for clamping or pressing against or retaining cover panels 44 and 46 in covering relation to the access openings of structure 12, respectively. Cover panels 44 and 46 each preferably include at least one integral receptacle 76 on outer wall 50 for cooperatively receiving a bracket 72, respectively, and for preventing shifting or movement of the panel 44, 46, due to vibration or the like.

Additionally referring to FIG. 8, cover panel 44 is shown tilted outwardly relative to opening 32 for installation therein, or removal therefrom. In this position, edge 58 of panel 44 is shown resting on lower edge 34 of lower frame member 22 of side sheet structure 12, and is either tiltable further outwardly for removal, or inwardly toward structure 12, to position lips 66 and 70 in abutment with edges 30 and 36, respectively. To facilitate installation and removal, outer wall 50 preferably includes at least one integral handle 78 projecting sidewardly therefrom, and at least one integral handle 80 at a middle location thereon, or otherwise positioned for grasping for handling panel 44 during installation and removal from opening 32. Panel 44 can additionally include one or more integral stiffening ribs 82 and a concave portion 84 which faces threshing region 14, as desired. Panel 46 is preferably made in the same manner as panel 44 and includes many of the same features, particularly lower lip 64.

Because of the blow molded manufacture of panels 44 and 46, with integral features, namely lower lip 64 and handles 78 and 80, substantial cost savings are realized compared to constructions wherein these features comprise separate components. The lips around the periphery of the panels also provide better sound insulation and dust and grain containment.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A one piece blow molded cover panel removably positionable in an access opening in a structure adjacent to a threshing region of an agricultural combine, the structure including an elongate upper edge facing away from the threshing region, an elongate lower edge opposite the upper edge and facing toward the threshing region, and spaced side edges extending between the upper edge and lower edge, defining and extending around the access opening, the access opening having a predetermined upward to downward extent between the upper and lower edge and a predetermined side to side extent between the side edges, the cover panel comprising an inner wall, an outer wall generally co-extending with the inner wall in spaced relation thereto defining at least one cavity therebetween, an elongate upper peripheral edge connecting the inner and outer walls and enclosing an upper periphery of the at least one cavity therebetween, an elongate lower peripheral edge connecting the inner and outer walls and enclosing a lower periphery of the at least one cavity therebetween, and elongate spaced, side peripheral edges connecting the inner and outer walls and enclosing opposite side peripheries of the at least one cavity, an inner lower lip extending downwardly from the inner wall and the lower peripheral edge along substantially the length thereof, and an outer upper lip extending upwardly from the outer wall and the upper peripheral edge along substantially the length thereof, the cover panel having an upward to downward extent as measured between the upper peripheral edge and the lower peripheral edge thereof only marginally smaller than the upward to downward extent of the access opening, and the panel having a sideward extent as measured between the side peripheral edges marginally smaller than the sideward extent of the access opening, such that the cover panel is insertable into the access opening in covering relation thereto with the inner wall facing the threshing region, the inner lower lip in abutting generally conforming relation to the lower edge of the structure along the length thereof and the outer upper lip in abutting relation to the upper edge of the structure such that crop material in the threshing region which strikes the inner wall will be prevented from contacting the lower edge of the structure.

2. The cover panel of claim 1, further comprises at least one handle molded so as to form a portion of the outer wall of the panel.

3. The cover panel of claim 1, wherein the outer wall includes at least one latch molded therein.

4. The cover panel of claim 1, wherein the lower peripheral edge has a tapered shape extending downwardly from the outer wall to the inner wall.

5. A unitary blow molded cover panel for an access opening in a side sheet of an agricultural combine adjacent to a threshing region thereof, the side sheet including an elongate upper edge defining an upper peripheral region of the access opening and an elongate lower edge below and opposite the upper edge defining a lower periphery of the opening, the opening having a vertical extent defined between the upper and lower edges of the side sheet, the cover panel comprising:

a unitary molded double wall body including an inner wall and a generally coextensive outer wall spaced from the inner wall, an upper peripheral edge connecting upper ends of the inner and outer walls and enclosing an upper periphery of the space therebetween, a lower peripheral edge connecting lower ends of the inner and outer walls enclosing a lower periphery of the space therebetween, a lower lip extending downwardly from the inner wall along the lower end thereof, and an upper lip extending upwardly from the outer wall along the upper end thereof, the body having a vertical extent as measured between the upper and lower peripheral edges thereof marginally smaller than the vertical extent of the access opening, such that the body is insertable into the opening in covering relation thereto with the upper lip extending along the elongate upper edge of the side sheet in abutment with a surface adjacent thereto opposite the threshing region of the combine, and the lower lip extending along the elongate lower edge of the sheet in abutment with a surface thereof facing the threshing region and the inner wall of the body facing the threshing region such that crop material in the threshing region which strikes the inner wall will be prevented from contacting the elongate lower edge of the side sheet.

6. The cover panel of claim 5, wherein the side sheet includes spaced, elongate side edges extending between the upper and lower edges defining the side peripheral regions of the access opening, the access opening having a side to side extent between the side edges, and the cover panel comprising opposite, spaced side edges extending between the inner and outer walls enclosing opposite side peripheries of the space therebetween, and side lips extending sidewardly in opposite directions from the outer wall so as to be in abutment with surfaces adjacent the side edges of the sheet when the panel is in the access opening.

7. The cover panel of claim 5, including at least one handle integrally formed with the outer wall of the body.

8. The cover panel of claim 5, including at least one handle extending sidewardly from a side edge of the body of the cover panel.

9. The cover panel of claim 5, wherein the body is blow molded of a polyethylene.

10. The cover panel of claim 5, further comprising at least one receptacle for a latch on the outer wall of the body.

11. A one piece blow molded cover panel removably positionable in an access opening of a structure adjacent to a threshing region of an agricultural combine, the cover panel comprising an inner wall, an outer wall generally co-extending with the inner wall in spaced relation thereto defining at least one cavity therebetween, and elongate upper and lower peripheral edges, and elongate spaced, side peripheral edges extending therebetween, a lower inner lip extending downwardly from the inner wall and the lower peripheral edge along substantially the length thereof, and an outer upper lip extending upwardly from the outer wall and the upper peripheral edge along substantially the length thereof, the cover panel being insertable into the access opening to position the lower peripheral edge on a lower edge of the structure defining a lower periphery of the opening with the lower inner lip extending downwardly through the opening, such that the panel can be tilted into the opening to bring the outer upper lip into abutting relation to an upper edge of the structure defining an upper periphery of the opening and the lower inner lip into covering relation to the lower edge of the structure to prevent crop material in the threshing region from collecting on the lower edge.

12. The cover panel of claim 11, wherein the lower peripheral edge of the cover panel is inclined downwardly from the outer wall to the inner wall.

13. The cover panel of claim 11, wherein the outer wall includes at least one latch molded therein.

14. The cover panel of claim 11, wherein the outer wall comprises at least one handle molded therein or thereon.

15. The cover panel of claim 11, including at least one handle molded therein or thereon so as to extend sidewardly from a side peripheral edge of the panel.

* * * * *